US006940679B1

(12) United States Patent
McNeil et al.

(10) Patent No.: US 6,940,679 B1
(45) Date of Patent: Sep. 6, 2005

(54) METHOD AND APPARATUS FOR INCREASING TRACK DENSITY BY ADAPTING WRITE FAULT GATE TO POSITION ERROR SIGNAL AS IT VARIES FROM ID TO OD

(75) Inventors: Michael McNeil, Nederland, CO (US); Thomas Melrose, Longmont, CO (US); Keith Malang, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 278 days.

(21) Appl. No.: 10/008,263

(22) Filed: Nov. 7, 2001

Related U.S. Application Data

(60) Provisional application No. 60/246,341, filed on Nov. 7, 2000.

(51) Int. Cl.[7] .............................................. G11B 5/596
(52) U.S. Cl. ......................... 360/77.04; 360/60; 360/61
(58) Field of Search ............................. 360/77.04, 31, 360/25, 75, 60, 61

(56) References Cited

U.S. PATENT DOCUMENTS

| | | | | |
|---|---|---|---|---|
| 4,783,705 A | * | 11/1988 | Moon et al. ............. 360/77.08 |
| 5,600,500 A | | 2/1997 | Madsen et al. ............... 360/46 |
| 6,178,054 B1 | * | 1/2001 | Wakefield ..................... 360/31 |
| 6,249,393 B1 | | 6/2001 | Billings et al. ................ 360/31 |
| 6,275,346 B1 | * | 8/2001 | Kim et al. ..................... 360/31 |
| 6,405,277 B1 | | 6/2002 | Jen et al. ......................... 711/4 |
| 6,408,406 B1 | | 6/2002 | Parris ........................... 714/41 |
| 6,421,197 B1 | * | 7/2002 | Abdelnour ............... 360/77.02 |
| 6,421,198 B1 | * | 7/2002 | Lamberts et al. ......... 360/77.04 |
| 6,445,521 B1 | | 9/2002 | Schaff et al. .................. 360/31 |
| 6,519,107 B1 | * | 2/2003 | Ehrlich et al. ................ 360/75 |
| 6,618,219 B1 | * | 9/2003 | Ho ........................... 360/77.04 |

OTHER PUBLICATIONS

U.S. Appl. No. 09/579,155, filed May 25, 2000, Levy et al.

* cited by examiner

*Primary Examiner*—David Hudspeth
*Assistant Examiner*—K. Wong
(74) *Attorney, Agent, or Firm*—Tejpal S. Hansra

(57) ABSTRACT

A disk drive utilizes a track dependent variable write fault gate for each of the transducers within the drive. By deriving a 3 sigma distribution across the repeatable run out (RRO) and the non-repeatable run out (NRRO), a position error signal (PES) is derived which varies in magnitude across the stroke of the transducers and which has a slope used to derive variable write fault gate thresholds for the tracks associated with each transducer. As the stroke of the transducer moves from the outer diameter (OD) to the inner diameter (ID), the magnitude of the write fault gate thresholds may be decreased relative to the PES, and track density and capacity may increase where PES and write fault gate thresholds are low. The invention thus maintains a constant hard error recovery margin across the stroke.

47 Claims, 7 Drawing Sheets

METHOD AND APPARATUS FOR INCREASING TRACK DENSITY BY ADAPTING WRITE FAULT GATE TO POSITION ERROR SIGNAL AS IT VARIES FROM ID TO OD

Priority is claimed from U.S. Provisional Patent Application Ser. No. 60/246,341 filed Nov. 7, 2000 entitled "Method to Achieve High Track Density by Adapting the Write Fault Gate to the Position Error Signal as it Varies Across the Stroke from ID to OD," which is incorporated by reference in its entirety.

FIELD OF THE INVENTION

The invention relates generally to data storage systems and, more particularly, to a method for increasing track density of the magnetic storage medium associated with the data storage system.

BACKGROUND OF THE INVENTION

FIG. 1 is a block diagram illustrating a disk drive 100 in accordance with one embodiment of the present invention. As illustrated, the disk drive 100 is coupled to an external host computer 102 that uses the disk drive 100 as a mass storage device. It should be appreciated that the blocks illustrated in FIG. 1 are functional in nature and do not necessarily represent discrete hardware elements. For example, in one approach, two or more of the functional blocks within the disk drive 100 are implemented in software within a common digital processor.

With reference to FIG. 1, the disk drive 100 includes: at least one data storage disk 104, at least one transducer 106, an actuator arm assembly 108, a voice coil motor (VCM) 110, a read/write channel 112, an interface unit 120, a servo controller 122, and a disk drive controller 124. The disk drive 100 receives read and/or write requests from the host computer 102 and carries out the requests by performing data transfers between the at least one disk 104 and the host 102. In a preferred embodiment, the disk drive 100 includes multiple disks 104 in a vertical stack arrangement with one transducer 106 for each operative disk surface. Typically, both surfaces of each disk 104 will be operative for storing user data and, therefore, the disk drive 100 will include two transducers 106 for each disk 104. Single sided disk arrangements can also be used. The interface unit 120 is operative for providing an interface between the disk drive 100 and the host computer 102. During read and write operations, the interface unit 120 provides a communications path, including data buffering functions, between the host computer 102 and the read/write channel 112. In addition, the interface unit 120 is operative for receiving commands and requests from the host 102 and directing them to the controller 124. The controller 124 then carries out the commands by appropriately controlling the elements within the disk drive 100.

The voice coil motor (VCM) 110 is operative for controllably positioning the transducers 106 with respect to their corresponding disk surfaces in response to a control signal (e.g., $i_{control}$) generated by the servo controller 122. Each transducer 106 is coupled to an integrated arm assembly 108 and move together under the influence of the VCM 110.

When performing a read or write operation, the controller 124 instructs the servo controller 122 to move one of the transducers 106 to a target track on a corresponding disk surface so that a data transfer can take place. The servo controller 122 then generates a control signal to move the identified transducer 106 from a present location to the indicated target track in a process known as a "seek" operation. Once the transducer 106 has arrived at the target track, the servo controller 122 enters a "track follow" mode during which the transducer 106 is maintained in a substantially centered position above the target track. The data transfer between the transducer 106 and the target track occurs during this track follow mode.

The read/write channel 112 is operative for, among other things, performing the data transformations necessary to provide communication between the host computer 102 and the disk 104. For example, during a write operation, the read/write channel 112 converts digital data received from the host computer 102 into an analog write current for delivery to one of the transducers 106. During a read operation, the read/write channel 112 provides the data transformations necessary for converting an analog read signal received from one of the transducers 106 into a digital representation that can be recognized by the host computer 102. The read/write channel 112 is also operative for separating out servo information read by a transducer and for directing this servo information to the servo controller 122 for use in positioning the transducer.

A lookup table 126 in drive 100 is operative for storing a write fault gate track threshold value for the transducers on disk 104 in the disk drive 100. The write fault gate threshold values are used by the disk drive 100 during write operations to determine when a corresponding transducer has moved too far off-track to reliably write data to the track. When performing a write operation, the disk drive controller 124 first retrieves a write fault gate value from the lookup table 126 corresponding to the transducer 106 associated with the write operation. The controller 124 then allows data to be written to the target track only when the corresponding transducer 106 is within a positional window about the target track that is defined by the retrieved write fault gate threshold value. The disk drive controller 124 monitors the position of the transducer 106 during the write operation to determine whether it is within the threshold window. As long as the transducer 106 is positioned within the window, the write operation is allowed to continue. If the transducer 106 moves outside of the threshold window, the controller 124 suspends performance of the write operation until a future time. Typically, the controller 124 will resume writing data on a next pass of the corresponding portion of the target track as long as the transducer 106 is properly positioned at that time. The controller 124 typically controls the writing of data to the target track using a write enable signal delivered to the read/write channel 112.

FIG. 2 is a diagrammatic representation of a simplified top view of a disk 104 having a surface 242 which has been formatted to be used in conjunction with a conventional sectored servo system (also known as an embedded servo system), as will be understood by those skilled in the art. As illustrated in FIG. 2, the disk 104 includes a plurality of concentric tracks 244a–244h for storing data on the disk's surface 242. Although FIG. 2 only shows a relatively small number of tracks (i.e., 8) for ease of illustration, it should be appreciated that typically many thousands of tracks are included on the surface 242 of a disk 104.

Each track 244a–244h is divided into a plurality of data sectors 246 and a plurality of servo sectors 248. The servo sectors 248 in each track are radially aligned with servo sectors 248 in the other tracks, thereby forming servo wedges 250 which extend radially across the disk 104 (e.g., from the disk's inner diameter 252 to its outer diameter 254). The servo sectors 248 are used to position the transducer 106 associated with each disk 104 during operation of the disk drive 100. The data sectors 246 are used to store customer data, which is provided by the host computer 102.

FIG. 3 illustrates a data storage disk 104 that is used to store digital data in a magnetic disk drive system. The disk 104 is substantially circular in shape and includes a center point 312 located in the center of the disk. The disk 104 also includes a plurality of tracks on a surface 314 of the disk 104 for storing the digital data. Ideally, each of the tracks is non-perturbed and ideally shares a common center 312 with the disk 104, such as ideal track 316 illustrated in FIG. 3. Due to system imperfections, however, actual written tracks on the disk 104 can be perturbed as compared to ideal tracks, such as non-ideal track 318 in FIG. 3. Consequently, transducer positioning is not as accurate on track 318 as it would be on an ideal track. Perturbation can be the result of incorrectly written servo information relative to the ideal track centerline (RRO), and it can also be due to perturbation of the transducer itself relative to the ideal track centerline (NRRO).

As illustrated in FIG. 3, the tracks on the disk 104 are each divided into a plurality of sectors 322. Each sector 322 is divided into a servo data portion and a user data portion (as described for FIG. 2). The servo data portion includes, among other things, information for use by the disk drive in locating a transducer above a desired track of the disk 104. When a host computer requests that data be read from or written to a particular track/sector of the disk 104, the transducer must first be moved to the track and then must be positioned at a predetermined location with respect to the centerline of the track before data transfer can take place. The disk drive uses the information stored in the servo data portion of each sector to first locate the desired track and to then appropriately position the transducer with respect to the centerline of the desired track.

FIG. 4 illustrates a typical servo pattern 424 stored within the servo portion 248 of a sector 322 for use in centering a transducer 106 on a desired track. The servo pattern 424 includes a plurality of servo bursts 426–432 that define the centerlines 434–438 of the tracks of the disk 104. The bursts 426–432 are divided into A bursts 426, 430 and B bursts 428, 432 that are each approximately a track-width wide and which alternate across the disk surface. The boundary between an A burst and an adjacent B burst (e.g., A burst 430 and B burst 428) defines the centerline (e.g., centerline 436) of a track on the disk. To center the transducer 106 using the A and B bursts, the transducer 106 is first moved to the desired track during a seek operation and, once there, is allowed to read the A and B bursts on the desired track. The signal magnitudes resulting from reading the A and B bursts are then combined (such as by subtracting the B burst magnitude from the A burst magnitude) to achieve an error signal, known as the position error signal (PES), which is indicative of the distance between the center of the transducer 106 and the centerline of the desired track. The PES signal is used by the disk drive to change the position of the transducer 106 to one that is closer to the desired (centered) position. This centering process is repeated for each successive sector on the track until the requested read/write operation has been performed in the appropriate sector 322 of the disk 104. It should be appreciated that other schemes for storing servo information on the magnetic media (such as schemes using zones, constant linear density (CLD) recording, split data fields, and/or hybrid servo) can also be used in accordance with the present invention.

The A and B bursts 426–432, as well as other servo information, are written to the surface 314 of the disk 104 using a servo track writer (STW) after the disk 104 is assembled into the disk drive during the manufacturing process. It is these A and B bursts which define the location of the written tracks on the disk 104. That is, on a non-ideal track (such as track 318 of FIG. 3) the A and B bursts are written such that the centerline of the track is not smooth, but rather is perturbed; this is the source of RRO. Further, a transducer can be made to position itself in a window positionally relative to the path of an ideal track by adding an appropriate offset value to the PES signal. Offset values, relative to the known RRO, may be used to modify the controller commands to the actuator and correct the RRO as the transducer follows the track. RRO correction values are stored within the servo portions 248 of each sector 322 of the disk for use in positioning the transducer 106 in an approximation of ideal track path, such as 316, during track following operations.

As above mentioned, when a transducer moves off-track during a write operation, there is a chance that the transducer might inadvertently write data on or near an adjacent track, thus corrupting the data written on the adjacent track. In addition, the data that is written off-track by the transducer may be difficult or impossible to read during a subsequent read operation on the present track due to its off-track position. Thus, an off-track threshold value previously identified as a write fault gate is typically defined on a disk drive that indicates an off-track transducer position beyond which the write operations will be suspended. If the transducer goes beyond the limits of the write fault gate threshold during a write operation, the write operation is suspended until the transducer again comes within the specified positional window about the target track.

In the prior art, the write fault gate threshold was determined during disk drive development based upon collected (worst case) off-track threshold data and estimates of transducer positioning error. Using a 3-sigma statistical distribution of the estimates of the transducer positioning error, a write fault gate threshold was set to an approximate value of value of 1.3 times the 3-sigma value of the position error at the worst case of the stroke, i.e., at the outer diameter (OD).

The single write fault gate threshold value thus derived was then used for all transducers within all drives in a production run. During disk drive tests, if the off track capability of the transducers in a particular drive were all within a specified range and the measured position error of the drive was within a corresponding range, the disk drive would pass certification limits. It would be assumed that the write fault gate threshold programmed into the drive would be sufficient to prevent adjacent track data corruption and unreadable off-track data. If the off track capability of a transducer was not within the specified range, the transducer would not be used in a disk drive. Similarly, if a particular disk drive displayed greater than a predetermined position error, the drive also would not be used. As can be appreciated, the greater the number of units that are left unused during the manufacturing process, the greater the overall manufacturing costs.

In an attempt to overcome the shortcomings of specifying a single off-track capability/write fault gate value for an entire production run of disk drives, unique off-track capability/write fault gate values were generated for individual disk drives during the manufacturing process. The write fault gate threshold values were determined based on the measured off track capability of each of the transducers actually within each drive as well as a positioning error associated with that disk drive.

Because the write fault gate values were variable from drive to drive, transducers that were previously discarded as not falling within a predetermined off track capability range could be used as long as they occur in a drive having lower positioning errors. Similarly, drives having a large positioning error can be used if paired with transducers having superior off track capability. In this manner, manufacturing yields were increased without compromising disk drive performance.

Accordingly, in the recent prior art, a separate write fault gate threshold value was generated for each of the transducers within a manufactured disk drive. In one approach, a look up table is provided within the disk drive for storing the write fault gate values used by the drive. An appropriate value is retrieved from the look up table for each write operation performed by the disk drive. These write fault gate values are normally generated during the test procedure as part of the manufacturing process. Again, the prior art values are based on the position error at the worst case condition.

While the above described method of generating separate write fault gate values for each of the transducers in a disk drive permits matching transducers to a drive, enabling more drives to be certified for shipment, the write fault gate threshold values for the transducers are still limited by the minimum write fault gate threshold attributable to the position error at the worst case, i.e., at the outer diameter. Factors at the OD, such as air turbulence, radial distance from the inner diameter, etc., increase the threshold values of the write fault gates. At present, the write fault gate thresholds associated with a disk drive, even those providing write fault gate thresholds for each transducer, are a constant across the stroke of the actuator. However, tracks along the inner diameter, less subjected to the errors such as flutter, turbulence, vibration, etc. introduced into the disk along the outer diameter, may utilize smaller write fault gate thresholds but are still constrained to the same write fault gate thresholds as at the outer diameter tracks.

Accordingly, it would be advantageous to provide a method to accommodate the decrease in the write fault gate threshold requirements on the tracks as the transducer moves along the stroke toward the inner diameter of the platter, permitting a reduction in the track width and an attendant increase in track density.

SUMMARY OF THE INVENTION

The present invention is directed to a method for increasing the capacity of a disk drive by increasing the track density for each disk in the drive.

By measuring the changes in the position error as a transducer moves across the stroke between the outer diameter (OD) and the inner diameter (ID), values for the repeatable run out (RRO) and the non-repeatable run out (NRRO) may be obtained. Taking the root mean square (rms) of the RRO and the NRRO, a 3 sigma standard deviation position error signal (PES) curve may be derived.

The slope of the PES curve decreases across the stroke as the stroke moves from the OD towards the ID. The write fault gate thresholds for the tracks can be decreased in relation to the decrease of the slope, increasing the track density as the stroke approaches the ID, increasing the capacity of the drive.

Using the PES curve, the track-spacing may be varied with respect to the location of the track in relation to a position along the stroke by adjusting the write fault gate thresholds in relation to the slope of the PES curve.

By adjusting the write fault gate (WFG) threshold to the PES, a more uniform margin to encroachment failure is provided across the entire stroke of the actuator; i.e., prior art had more margin at the ID. WFG thresholds provide the limit as to how far a transducer can write off-track, so with equalized encroachment margin, tracks can be spaced closer together at the ID. In other words, the maximum WFG threshold will be made constant as a percent of track-spacing by increasing track-spacing density where the PES is low. This provides a net gain in capacity through servo track-writing of more tracks on the disk where the PES is low.

This concept can be applied in many ways, three of which are: (1) A common PES curve between ID and OD can be established for a population of drives, and a variable track-spacing profile (curve) can be implemented for the whole population at the servo track-writer; (2) The PES can be measured by the servo track-writer for each drive and each surface at several points across the stroke, and from this data a unique track-spacing profile (curve) can be calculated for the worst PES on the worst transducer in the drive; (3) The PES can be measured by the servo track-writer for each drive and each surface at several points across the stroke, and from this data a unique track-spacing profile (curve) can be calculated for each transducer in the drive and a unique track-spacing profile (curve) can be written by the servo track-writer for each transducer and each surface in the drive.

The servo track-writing function, where track-spacing density is increased, can be performed by a conventional servo track-writer, by self-servo track-writing, or by a variable track-spacing servo system. It will be obvious to those skilled in the art upon reading this disclosure that other implementations are also possible.

DETAILED DESCRIPTION

Figure 1:
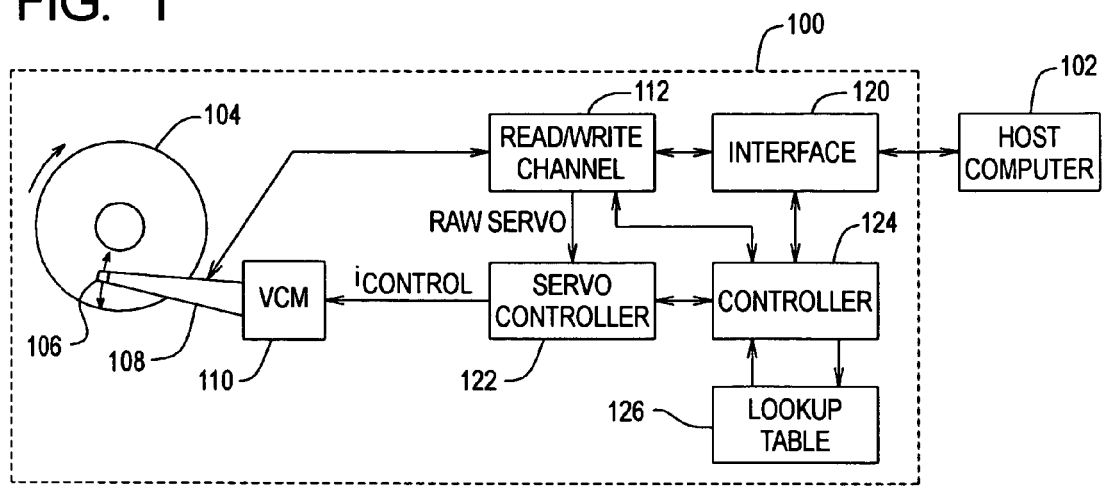
FIG. 1 is a block diagram illustrating a disk drive in accordance with one embodiment of the present invention.
Figure 2:
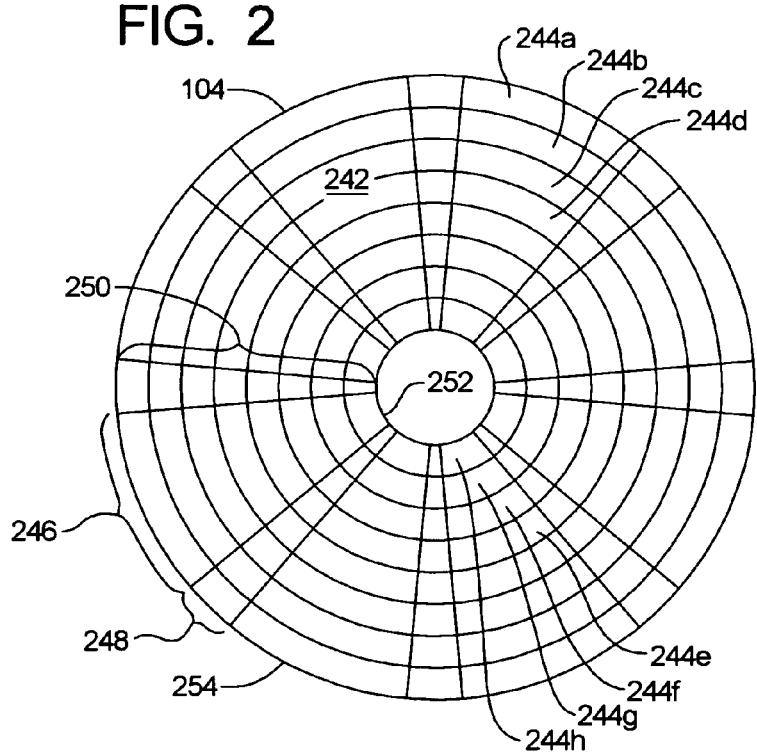
FIG. 2 is a diagrammatic representation of a simplified top view of a disk having a surface which has been formatted to be used in conjunction with a conventional sectored servo system.
Figure 3:
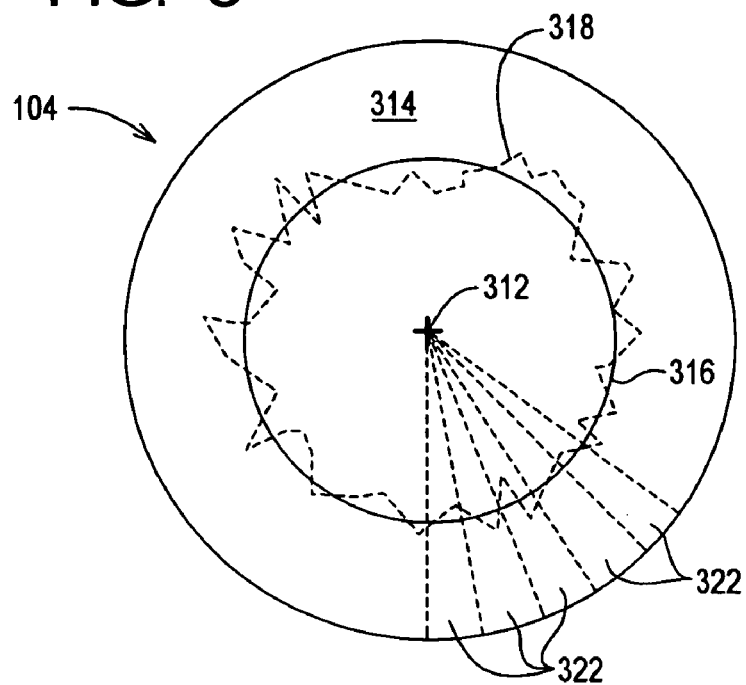
FIG. 3 is a top view of a data storage disk illustrating a perturbed data track that can be compensated for in accordance with the present invention.
Figure 4:
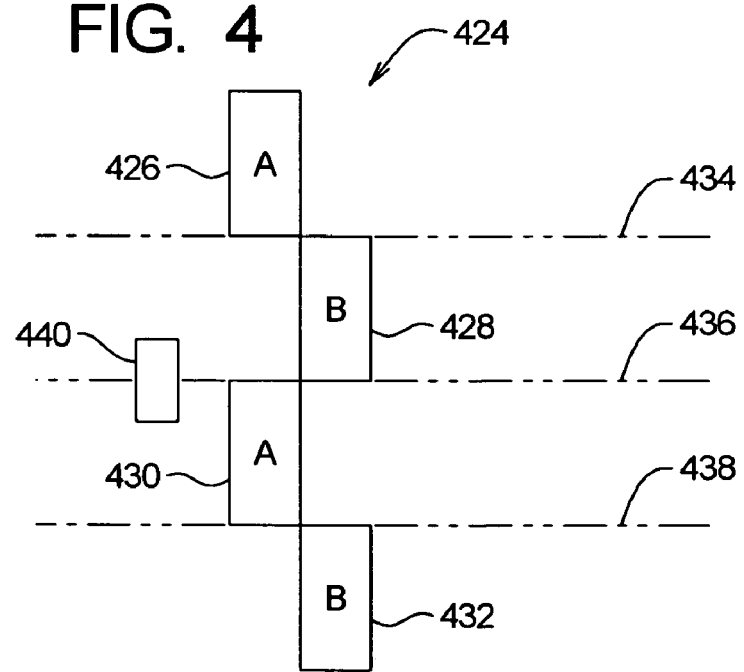
FIG. 4 is a schematic diagram of a servo burst pattern that is used to position a transducer with respect to a track centerline.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

In conceiving of the present invention, the inventors have made a number of observations, some of which are listed below. Specifically, the inventors have recognized that track write width is a function of the write fault gate of that track with the write fault gate being a function of position error. Further, position error is a function of disk radius, decreasing as the radius approaches the inner diameter (ID) of the disk.

Additionally, the prior art uses steps of equal angle at the servo track writer which has the effect of increasing the track density at a rate approximately proportional to the inverse of the cosine of the skew angle of the head. As a result, it was noted that the magnetic track width decreases at a rate approximately proportional to the cosine of the skew angle of the head so that the effective write width shrinks as track density increases.

As is well known in the art, data storage capacities in magnetic storage devices are rapidly increasing. This increase in storage capacity is in large part due to the improvement in increased recording density on the magnetic media, allowing more data to be stored per unit area on the media. As the data density continues to increase, the number of tracks per inch (TPI) increases, resulting in a decreased track width for each track.

Figure 5:
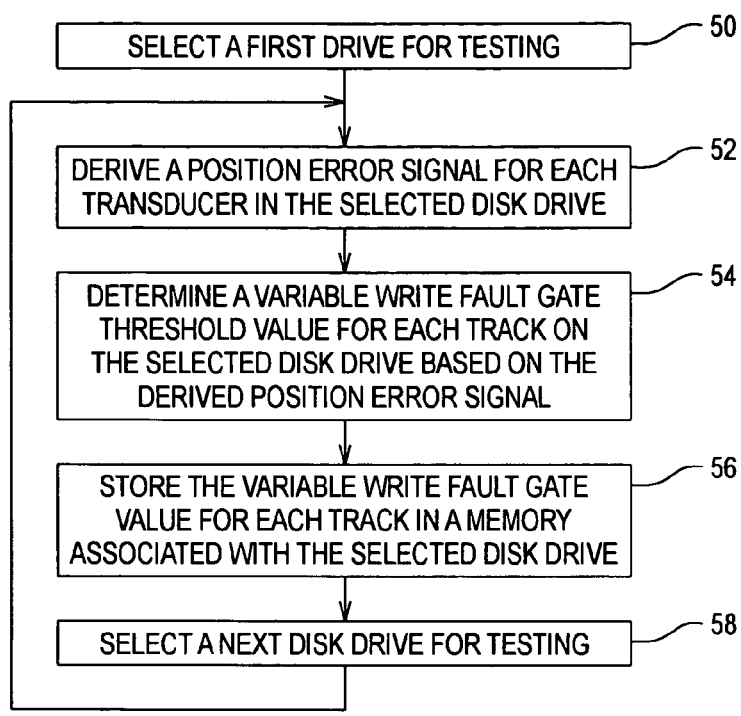
FIG. 5 is a flowchart illustrating a method for generating and storing write fault gate values during a disk drive manufacturing process in accordance with one embodiment of the present invention.

Referring now to FIG. 5, there is shown a flowchart illustrating a method for generating and storing variable write fault gate threshold values during a disk drive manufacturing process in accordance with one embodiment of the present invention. A first disk drive is initially chosen for testing purposes (step 50). The disk drive is typically chosen from a queue of assembled drives waiting to be tested. An off-track threshold value is then determined for each transducer within the selected disk drive. This is done by deriving a Position Error Signal (PES) across the stroke for each transducer in the selected drive, which signal is indicative of a variable off track threshold signal for that transducer (step 52). An average PES value with respect to a track can be determined, and referring also to FIG. 6, by first measuring the repeatable run out (RRO) signal 40 in FIG. 6, and the non-repeatable run out (NRRO) signal 42 in FIG. 6, for the transducer under test. The RRO signal is a measure of the repeatable off-track perturbations of the transducer as a consequence of reading servo bursts which are off-track of the ideal track centerline. The NRRO is a measure of the non-repeatable off-track perturbations of the transducer while track following; these perturbations are one component of the PES. The PES is equal to the root mean square (rms) value of the RRO and NRRO signals.

Figure 6:
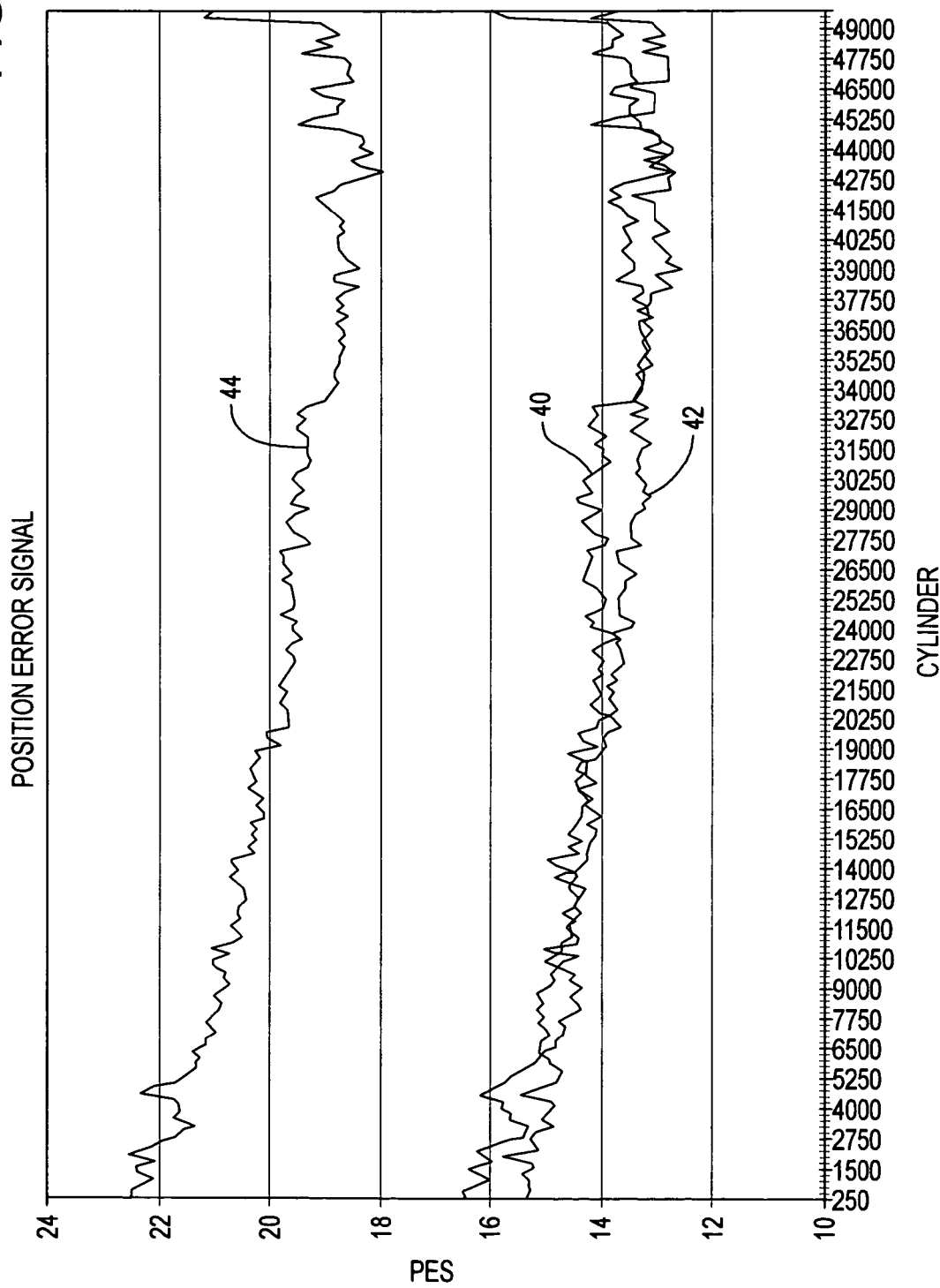
FIG. 6 is a graph illustrating the signals utilized in determining the Position Error Signal used for deriving the write fault gate values for storage.

In referring to FIG. 6, it is to be noted that the PES curve was developed using a disk rotational speed of 5400 r.p.m. Currently, rotation speeds up to 15,000 r.p.m. have also been used. The effect of higher rpm is more turbulence affecting the head and disk, such that the slope of the PES curve becomes steeper between the OD and the ID.

Once the PES is determined, a variable write fault gate threshold, i.e., the boundaries for each track along the stroke where the transducer can effectively operate without error, can be determined for the transducer under test (step 54) with the write fault gate being varied as a function of the PES signal along the stroke such that, and referring again to FIG. 6, the track PES and write fault gate threshold decease as the slope of the PES signal across the stroke from the OD to the ID decreases. Thus, based on the derived PES signal, at least one write fault gate threshold value, variable with respect to each track along the stroke, may be derived for each of the tracks within the disk drive and stored in a memory associated with the disk drive under test such as, (step 56). This stored PES data maybe used to increase track-spacing density where the PES is low. This operation is performed by the servo track-writer, or a self-servo write system.

In one aspect of the present invention, the lookup table 26 stores multiple write fault gate values, i.e., a separate, variable, value for each of the tracks on the disk drive 100 associated with a transducer 106. These write fault gate threshold values are specified as a variable function of radial position of the track on the corresponding disk surface. Thus, when data is being written to a target track on a disk surface, a write fault gate threshold value corresponding to that particular track is retrieved from the lookup table and used during the write operation. Again, the stored PES data may be used to increase track-spacing density where the PES is low, with the operation performed by the servo track-writer, or a self-servo write system.

A next disk drive is then selected for testing (step 58) and the method is repeated. The above-described method will preferably be repeated for every disk drive in the production run. This concept can be applied in many ways, three of which are: (1) A common PES curve between ID and OD can be established for a population of drives, 1 and a variable track-spacing profile (curve) can be implemented for the whole population at the servo track-writer; (2) The PES can be measured by the servo track-writer for each drive and each surface at several points across the stroke, and from this data a unique track-spacing profile (curve) can be calculated for the worst PES on the worst transducer in the drive; (3) The PES can be measured by the servo track-writer for each drive and each surface at several points across the stroke, and from this data a unique track-spacing profile (curve) can be calculated for each transducer in the drive and a unique track-spacing profile (curve) can be written by the servo track-writer for each transducer and each surface in the drive.

FIGS. 7–11 are portions of a flowchart illustrating a detailed method for determining variable write fault gate threshold values for a disk drive in accordance with one embodiment of the present invention. The method is preferably performed during a disk drive testing procedure that is part of the disk drive manufacturing process. The method is further preferably performed after head optimization, channel optimization, and servo calibration procedures have been performed for the disk drive.

Figure 7:
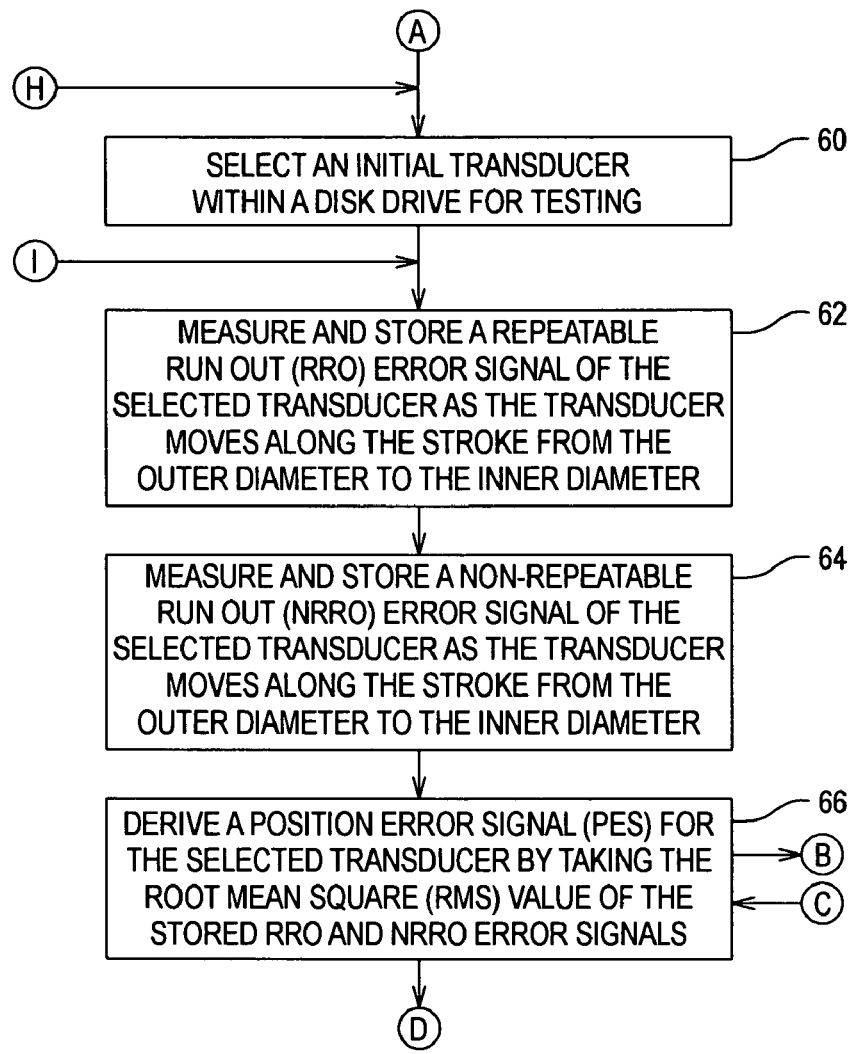
FIGS. 7–11 are portions of a flowchart illustrating a detailed method for determining write fault gate values for a disk drive in accordance with one embodiment of the present invention.

With reference to FIG. 7, at 'A', an initial transducer is first selected for testing within the disk drive (step 60). Using the selected transducer, a repeatable run out (RRO) error signal of the selected transducer is measured for each track as the transducer moves along the stroke from the outer diameter to the inner diameter of the disk drive (step 62). Referring also to FIG. 6, a typical RRO error signal measured across the stroke may be seen at 40. Next, a non-repeatable run out (NRRO) error signal is measured for the each track again as the transducer moves along the stroke from the outer diameter to the inner diameter and a typical NRRO signal measure may be seen in FIG. 6 as 42 (step 64).

Figure 9:
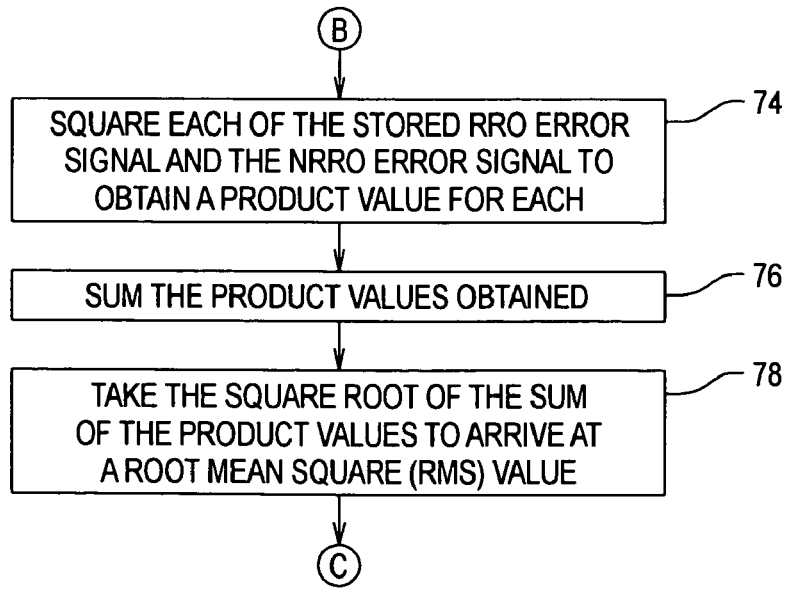
Figure 10:
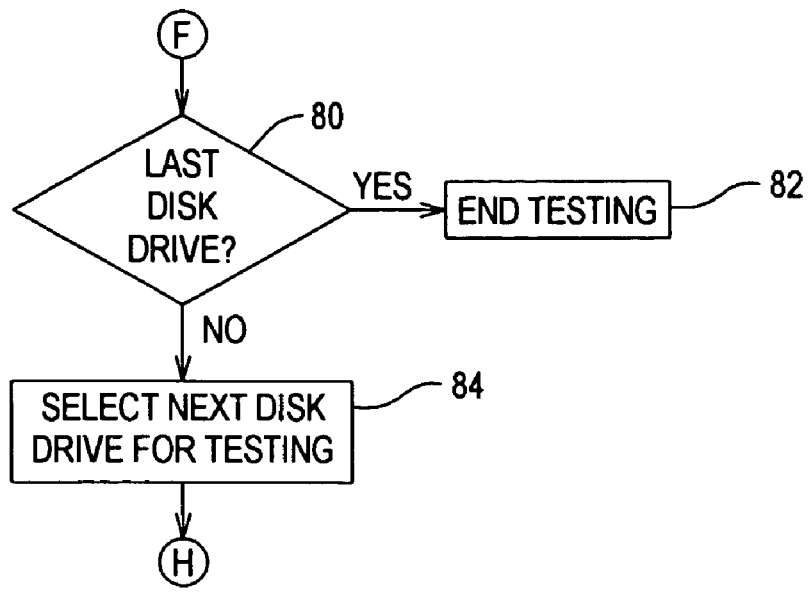

From the RRO error signal 40 and the NRRO error signal 42, a position error signal (PES) 44 (see FIG. 6) for the selected transducer may be derived. Referring now to FIG. 9, each of the stored RRO error signal and the NRRO error signal, 40, 42 respectively, are squared to obtain a product value for each. Next, the product values obtained for the RRO and NRRO error signals 40, 42 are summed (step 76).

Taking the square root of the sum with the product values, a root mean square value which is the position error signal (PES) is derived (step 70A).

Figure 8:
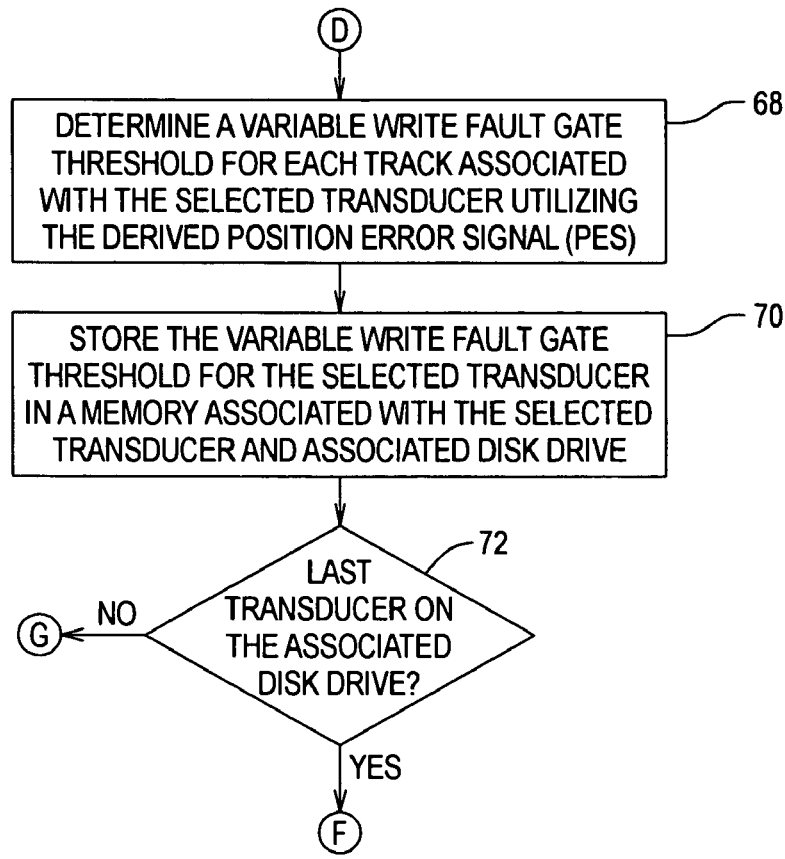

Utilizing the position error signal thus derived, and referring now to FIG. 8, step 68, a variable write fault gate threshold value for the tracks across the stroke may be determined. Referring again to FIG. 6, the slope along the derived PES signal may be seen at 44 to include an error signal for each track that varies in magnitude as the transducer traverses the stroke between the outer diameter and the inner diameter.

This variation in the PES magnitude provides the capability of varying the write fault gate, such as narrowing it as the PES varies from the outer to the inner diameter. In so doing, track density on the disk drive may be increased by the servo track-writer as the PES varies across the stroke. This concept can be applied in many ways, among which are: (1) A common PES curve between ID and OD can be established for a population of drives, and a variable track-spacing profile (curve) can be implemented for the whole population at the servo track-writer; (2) The PES can be measured by the servo track-writer for each drive and each surface at several points across the stroke, and from this data a unique track-spacing profile (curve) can be calculated for the worst PES on the worst transducer in the drive; (3) The PES can be measured by the servo track-writer for each drive and each surface at several points across the stroke, and from this data a unique track-spacing profile (curve) can be calculated for each transducer in the drive and a unique track-spacing profile (curve) can be written by the servo track-writer for each transducer and each surface in the drive.

The variable write fault gate threshold for the tracks associated with the selected transducer may, as above described, then be stored in a memory associated with the selected transducer and associated disk drive. (Step 70) Next the method checks to see if this is the last transducer on the associated disk drive (Step 72). If it is the last transducer, and referring now to FIG. 10, step 80, the testing is ended as in step 82. However, if it is not the last disk drive, then the next disk drive is selected for testing as in step 84 returning back to FIG. 7.

Figure 11:
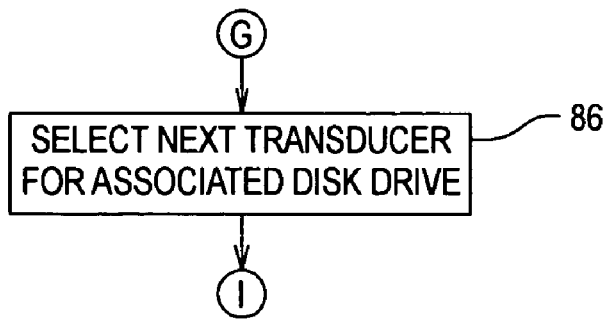

If, in step 72, the "last transducer" check shows that this is not the last transducer on the associated disk drive, and referring now to FIG. 11, the method selects the next transducer for the associated disk drive to be tested as may be seen in step 86.

Although the above description is directed to an embodiment in which a unique track spacing profile is applied to every transducer and surface in the drive, other embodiments directed to applying a PES derived from a population of drives and one calculated to utilize the PES for the worst transducer in a drive are also considered within the preview of this disclosure.

Referring again to FIG. 5, the average PES signal 44 for each track along the stroke is used to determine the write fault gate thresholds for such track. As the PES value varies in magnitude the write fault gate thresholds may be adjusted without the associated transducer exceeding the threshold limits.

Thus, as the magnitude of the write fault gate thresholds associated with the tracks narrow across the stroke as the transducer moves from the outer toward the inner diameter of the disk surface, track density increases as track width decreases.

Accordingly, track density increases toward the inner diameter (ID) at a rate proportional to the decrease in position error such that hard error recovery margin due to squeeze encroachment is equal across the stroke of the actuator.

Although the present invention has been described in conjunction with its preferred embodiments, it is to be understood that modifications and variations may be resorted to without departing from the spirit and scope of the invention as those skilled in the art readily understand. For example, the inventive principals can be used in conjunction with disk drives having a single write transducer. Further modification and variations are considered to be within the purview and scope of the invention and the appended claims.

What is claimed is:

1. A method for increasing the storage capacity of a disk drive, comprising the steps of:
    providing a magnetic storage disk within the disk drive, said magnetic storage disk including a plurality of data tracks;
    deriving an independent write fault gate threshold for each of the plurality of data tracks using a position error signal (PES) in the absence of writing test data onto magnetic storage disk for deriving said independent write fault gate thresholds.

2. The method of claim 1 including deriving a position error signal (PES) from a measured repeatable run out (RRO) signal and a non-repeatable run out (NRRO) signal.

3. The method of claim 2 including measuring a signal magnitude for each of said RRO and NRRO signals for a transducer stroke across said disk.

4. The method of claim 3 including deriving said PES as a root mean square (rms) of said RRO and NRRO signals.

5. The method of claim 4 wherein said PES decreases across the stroke when moving from an outer diameter of said disk toward an inner diameter of said disk.

6. The method of claim 1 wherein the magnitude of each of said write fault gate thresholds decreases across a transducer stroke when moving between an outer diameter of said disk and an inner diameter of said disk.

7. The method of claim 1 including measuring a signal magnitude for each of said RRO and NRRO signals for a transducer stroke across said disk.

8. The method of claim 7 including deriving said PES as a root mean square (rms) of said RRO and NRRO signals.

9. The method of claim 8 wherein said PES decreases across the stroke when moving from an outer diameter of said disk toward an inner diameter of said disk.

10. The method of claim 9 wherein the magnitude of each of said write fault gate thresholds decreases across a transducer stroke when moving between an outer diameter of said disk and an inner diameter of said disk.

11. A method of increasing the storage capacity of a disk drive comprising the steps of:
    assembling a disk drive, wherein said disk drive includes at least one disk;
    writing a plurality of servo tracks on the surface of said at least one disk;
    ascertaining an independent write fault gate value for each of a plurality of said servo tracks using a position error signal (PES), in the absence of writing test data onto the at least one disk for ascertaining said independent write fault gate values; and
    storing said independent write fault gate values in said disk drive.

12. The method of claim 11 wherein said ascertaining step includes measuring a repeatable run out (RRO) signal and a non-repeatable run out (NRRO) signal.

13. The method of claim 12 including deriving a position error signal (PES) from said measured repeatable run out (RRO) signal and a non-repeatable run out (NRRO) signal.

14. The method of claim 13 including measuring a signal magnitude for each of said RRO and NRRO signals for a transducer stroke across said disk.

15. The method of claim 14 including deriving said PES as a root mean square (rms) of said RRO and NRRO signals.

16. A method of servo track writing for a hard disk, comprising the steps of:
assembling a disk drive, wherein said disk drive includes at least one disk, said disk having at least one surface;
writing a plurality of servo tracks on said surface of said at least one disk;
ascertaining a write fault gate value for each servo track before writing the next servo track using a position error signal (PES), in the absence of writing test data onto said at least one disk for ascertaining said write fault gate values; and
using an ascertained write fault gate value to determine the position of the next servo track.

17. The method of claim 16 wherein said ascertaining step includes measuring a repeatable run out (RRO) signal and a non-repeatable run out (NRRO) signal.

18. The method of claim 17 including deriving a position error signal (PES) from said measured repeatable run out (RRO) signal and a non-repeatable run out (NRRO) signal.

19. The method of claim 18 including measuring a signal magnitude for each of said RRO and NRRO signals for said ascertained write fault gate value.

20. The method of claim 19 including deriving said PES as a root mean square (rms) of said RRO and NRRO signals.

21. A method of servo track writing for a hard disk, comprising the steps of:
assembling a disk drive, wherein said disk drive includes at least one disk, said disk having at least one surface;
collecting historical write fault gate data for like hard disks;
writing a plurality of servo tracks on said surface of said at least one disk;
ascertaining a write fault gate value for each servo track from said collected data using a position error signal (PES), in the absence of writing test data onto said at least one disk for ascertaining said write fault gate values; and
using an ascertained write fault gate value to determine the position of the written servo tracks.

22. The method of claim 21 wherein said ascertaining step includes measuring a repeatable run out (RRO) signal and a non-repeatable run out (NRRO) signal.

23. The method of claim 22 including deriving a position error signal (PES) from said measured repeatable run out (RRO) signal and a non-repeatable run out (NRRO) signal.

24. The method of claim 23 including measuring a signal magnitude for each of said RRO and NRRO signals for said ascertained write fault gate.

25. The method of claim 24 including deriving said PES as a root mean square (rms) of said RRO and NRRO signals.

26. A system for formatting a magnetic storage disk to increase track density, comprising:
a magnetic storage disk having a plurality of data tracks;
a servo track writer (STW) in communication with said disk storage system for deriving variable write fault gate threshold information using a position error signal (PES), in the absence of writing test data onto said disk for deriving said variable write fault gate threshold information; and
means for receiving said write fault gate threshold information from said STW and incorporating same on each of said plurality of data tracks, increasing track density for said disk.

27. The system of claim 26 including means for deriving a position error signal (PES) from a repeatable run out (RRO) signal and a non-repeatable run out (NRRO) signal received from said STW;
means responsive to said STW information for deriving each said write fault gate thresholds from said PES, each said write fault gates operative to reduce a track width for each of said data tracks, increasing track density.

28. The system of claim 27 wherein said PES decreases across a stroke of a transducer when moving from an outer diameter of said disk toward an inner diameter of said disk.

29. The system of claim 28 wherein magnitudes of each of said derived write fault gate threshold information decrease in relation to a transducer stroke when moving between an outer diameter of said disk and an inner diameter of said disk.

30. A hard disk drive comprising:
a housing, including a base plate;
at least one disk mounted on a hub and rotated relative to a base plate, said disk comprising a plurality of tracks for storing data;
an actuator assembly mounted on a shaft and rotated relative to said baseplate, said actuator assembly comprising an actuator arm having a distal end;
a transducer positioned at the distal end of said actuator arm and moveable relative to the surface of said disk; and
a write fault gate threshold that varies across the surface of said at least one disk, wherein the write fault gate threshold is derived from a position error signal (PES) in the absence of writing test data on the disk surface for deriving said write fault gate threshold.

31. The hard disk drive of claim 30, wherein said write fault gate threshold decreases from an outer diameter (OD) of said disk to an inner diameter (ID) of said disk, allowing said data tracks to be positioned closer together nearer the ID of said disk, thereby increasing the data density of said disk.

32. The hard disk drive of claim 30, wherein an independent write fault gate is individually assigned to each of a plurality of said tracks.

33. The hard disk drive of claim 31, wherein each track on said disk surface is associated with an independent write fault gate.

34. The hard disk drive of claim 31, wherein said write fault gate threshold decrease is associated with a decrease in a position error signal (PES) from the outer diameter (OD) of said disk to the inner diameter (ID) of said disk.

35. The hard disk drive of claim 34, wherein said position error signal (PES) is a sigma distribution taken as a root mean square of a measured repeatable run out (RRO) signal and a measured non-repeatable run out (NRRO) signal.

36. The hard disk drive of claim 35, wherein said position error signal (PES) may be expressed by the equation:

$$PES_{rms} = [(RRO)^2 + (NRRO)^2]^{1/2}$$

where $PES_{rms}$ is the rms position error signal;
RRO is the measured repeatable run out signal; and
NRRO is the measured non-repeatable run out signal.

37. A digital data storage system, comprising:
at least one data storage disk having at least one data storage surface having a plurality of substantially concentric tracks for storing digital data, each said track having an ideal shape and an actual written shape;

at least one transducer for use in writing digital data to said at least one data storage surface;

means for developing a position error signal (PES) for each of said plurality of tracks, said PES indicative of an offset of said actual written shape with respect to said ideal shape for a selected one of said plurality of tracks and operative for situating said at least one transducer to approximate said ideal shape; and means for deriving a separate write fault gate threshold for each of said tracks from said PES, in the absence of writing test data onto said disk for deriving said separate write fault gate threshold for each of said tracks, said write fault gate threshold operative to prevent said transducer from performing a write operation to a selected track when said write fault gate threshold of such selected track is exceeded by said transducer.

38. The digital data storage system of claim 37 wherein said deriving means includes deriving a separate PES value with respect to each track.

39. The digital data storage system of claim 38 wherein said derived PES values decrease in magnitude with respect to each track as the transducer moves across the tracks from an outer diameter to an inner diameter of said disk.

40. The digital data storage system of claim 39, further including developing a repeatable run-out (RRO) and a non repeatable run-out (NRRO) value for each track for use in deriving said PES values.

41. The disk drive system of claim 40 wherein said derived PES values are the root mean square values of the RRO and the NRRO values for each track.

42. The disk drive system of claim 41 wherein said position error signal (PES) may be expressed by the equation:

$$PES_{rms}=[(RRO)^2+(NRRO)^2]^{1/2}$$

where $PES_{rms}$ is the rms position error signal;
RRO is the measured repeatable run out signal; and
NRRO is the measured non-repeatable run out signal.

43. A method of servo track writing for a disk drive, comprising the steps of:

assembling a population of like disk drives, wherein each drive includes at least one disk, each said disk having at least one surface with an inner and an outer diameter;

establishing a common position error signal (PES) curve between said inner and said outer diameter for each of said population of like drives;

developing a variable track-spacing profile from said common PES curve, in the absence of writing test data onto said at least one disk for developing said variable track-spacing profile; and implementing said variable track-spacing profile on each of said population of like disk drives.

44. A method of servo track writing for a hard drive, comprising the steps of:

assembling a disk drive, wherein said drive includes at least one disk and an associated transducer, said disk having at least one surface with an inner and an outer diameter;

measuring a position error signal (PES) at several points between said inner and outer diameters using a servo track writer (STW);

calculating a variable track-spacing profile based on a worst case PES measurement for a transducer in said drive, in the absence of writing test pattern data onto said at least one disk for calculating said variable track-spacing profile; and writing said profile to said drive with said STW.

45. A method of servo track writing for a hard drive, comprising the steps of:

assembling a disk drive, wherein said drive includes a plurality of disks, each disk having an associated transducer, each said disk having at least one surface with an inner and an outer diameter;

measuring a position error signal (PES) for each of said disks at several points between said inner and outer diameters using a servo track writer (STW);

calculating a variable track-spacing profile based on said PES measurement for each said associated transducer in said drive, in the absence of writing test pattern data onto one of said plurality of disks for calculating said variable track-spacing profile; and writing said profile for each said transducer to each said associated surface with said STW.

46. A hard disk drive comprising:

a housing, including a base plate;

at least one disk mounted on a hub and rotated relative to a base plate, said disk comprising a plurality of tracks for storing data;

an actuator assembly mounted on a shaft and rotated relative to said baseplate, said actuator assembly comprising an actuator arm having a distal end;

a transducer positioned at the distal end of said actuator arm and moveable relative to the surface of said disk; and a write fault gate threshold that varies across the surface of said at least one disk, wherein said write fault gate threshold decreases from an outer diameter (OD) of said disk to an inner diameter (ID) of said disk, allowing said data tracks to be positioned closer together nearer the ID of said disk, thereby increasing the data density of said disk, wherein said write fault gate threshold decrease is associated with a decrease in a position error signal (PES) from the outer diameter (OD) of said disk to the inner diameter (ID) of said disk, wherein said position error signal (PES) is a sigma distribution taken as a root mean square of a measured repeatable run out (RRO) signal and a measured non-repeatable run out (NRRO) signal, wherein said position error signal (PES) may be expressed by the equation:

$$PES_{rms}=[(RRO)^2+(NRRO)^2]^{1/2}$$

where $PES_{rms}$ is the rms position error signal;
RRO is the measured repeatable run out signal; and
NRRO is the measured non-repeatable run out signal.

47. A digital data storage system, comprising:

at least one data storage disk having at least one data storage surface having a plurality of substantially concentric tracks for storing digital data, each said track having an ideal shape and an actual written shape;

at least one transducer for use in writing digital data to said at least one data storage surface;

means for developing a position error signal (PES) for each of said plurality of tracks, said PES indicative of an offset of said actual written shape with respect to said ideal shape for a selected one of said plurality of tracks and operative for situating said at least one transducer to approximate said ideal shape; and means for deriving a separate write fault gate threshold for each of said tracks from said PES, said write fault gate threshold operative to prevent said transducer from performing a write operation to a selected track when said write fault gate threshold of such selected track is exceeded by said transducer, wherein said deriving means includes deriving a separate PES value with respect to each track, wherein said derived PES values decrease in magnitude with respect to each track as the transducer moves across the tracks from an outer diameter to an inner diameter of said disk, further including developing a repeatable run-out (RRO) and a non repeatable run-out (NRRO) value for each track for use in deriving said PES values, wherein said derived PES values are the root mean square values of the RRO and the NRRO values for each track, wherein said position error signal (PES) may be expressed by the equation:

$$PES_{rms} = [(RRO)^2 + (NRRO)^2]^{1/2}$$

where $PES_{rms}$ is the rms position error signal;

RRO is the measured repeatable run out signal; and

NRRO is the measured non-repeatable run out signal.

* * * * *